United States Patent
He et al.

(10) Patent No.: US 10,452,747 B2
(45) Date of Patent: Oct. 22, 2019

(54) DYNAMICALLY FORMATTING SCALABLE VECTOR GRAPHICS

(71) Applicant: Microsoft Technology Licensing, LLC., Redmond, WA (US)

(72) Inventors: Haitao He, Redmond, WA (US); Stephanie Lorraine Horn, Bellevue, WA (US); Thomas Roland Mignone, Seattle, WA (US); Matthew William Kernek, Seattle, WA (US); Ancuta Irina Zaharia, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 324 days.

(21) Appl. No.: 15/247,643

(22) Filed: Aug. 25, 2016

(65) Prior Publication Data
US 2017/0293592 A1    Oct. 12, 2017

Related U.S. Application Data

(60) Provisional application No. 62/320,989, filed on Apr. 11, 2016.

(51) Int. Cl.
| | | |
|---|---|---|
| G06F 17/21 | (2006.01) | |
| G06F 17/22 | (2006.01) | |
| G06F 3/0482 | (2013.01) | |

(52) U.S. Cl.
CPC .......... *G06F 17/211* (2013.01); *G06F 3/0482* (2013.01); *G06F 17/212* (2013.01);
(Continued)

(58) Field of Classification Search
None
See application file for complete search history.

(56) References Cited

U.S. PATENT DOCUMENTS

| 7,383,498 B1 | 6/2008 | Hickl et al. |
| 7,546,522 B2 | 6/2009 | Tolle et al. |

(Continued)

FOREIGN PATENT DOCUMENTS

| EP | 1637991 A1 | 3/2006 |
| EP | 1660985 A1 | 5/2006 |

(Continued)

OTHER PUBLICATIONS

Sara Soueidan, Styling and Animating SVGs With CSS, Smashing Magazine, Nov. 3, 2014, pp. 1-29 (Year: 2014).*

(Continued)

*Primary Examiner* — Howard Cortes
(74) *Attorney, Agent, or Firm* — Merchant & Gould

(57) ABSTRACT

The Scalable Vector Graphics (SVG) standard defines a way to describe two-dimensional graphics within the extensible markup language (XML) that can be interpreted by multiple programs. The SVG standard, however, lacks native support for several user experience features, such as look and feel settings (e.g., themes) that affect multiple objects within a document. The present disclosure, however, teaches how an SVG object may be made theme-aware and still comply with the SVG standard so that it is portable between files and applications that apply the present disclosure and those that do not. By enabling the dynamic updating of SVG objects, the benefits to the user experience and computer efficiency associated with standardized vector graphics and the document-wide application of look and feel settings can be realized without deviating from the SVG standard.

19 Claims, 12 Drawing Sheets

(52) U.S. Cl.
CPC .......... *G06F 17/218* (2013.01); *G06F 17/227* (2013.01); *G06F 17/2235* (2013.01); *G06F 17/2247* (2013.01)

(56) References Cited

U.S. PATENT DOCUMENTS

| | | |
|---|---|---|
| 7,840,901 B2 | 11/2010 | Lacey et al. |
| 7,873,946 B2 | 1/2011 | Lathrop et al. |
| 7,962,895 B2 | 6/2011 | Liu |
| 8,032,837 B2 | 10/2011 | Bowman et al. |
| 2004/0111673 A1* | 6/2004 | Bowman ................. G06F 9/451 715/234 |
| 2005/0193368 A1 | 9/2005 | Becker et al. |
| 2005/0193388 A1 | 9/2005 | Hayes, Jr. |
| 2007/0198915 A1 | 8/2007 | Hiyama et al. |
| 2013/0117684 A1 | 5/2013 | Ingole et al. |
| 2013/0127875 A1 | 5/2013 | Blas et al. |
| 2014/0164964 A1 | 6/2014 | Cannon et al. |
| 2014/0208203 A1* | 7/2014 | Tang ..................... G06F 17/212 715/252 |
| 2015/0193388 A1 | 7/2015 | Cornet |
| 2017/0139574 A1* | 5/2017 | Dong .................. G06F 3/04845 |

FOREIGN PATENT DOCUMENTS

| | | |
|---|---|---|
| WO | 2005031598 A1 | 4/2005 |
| WO | 2007015118 A1 | 2/2007 |

OTHER PUBLICATIONS

Sara Soueidan, Styling SVG <use> Content with CSS, Codrops, Jul. 16, 2015, pp. 1-31 (Year: 2015).*

"International Search Report & Written Opinion Issued in PCT Application No. PCT/US2017/025813", dated Jul. 19, 2017, 13 Pages.

Guy, Emma, "Dynamically changing SVG colours on Android", Published on: Nov. 29, 2015 Available at: https://medium.com/@emmaguy/dynamically-changing-svg-colours-on-android-b026a99137ad#.m0z0qc7ey.

* cited by examiner

DYNAMICALLY FORMATTING SCALABLE VECTOR GRAPHICS

CROSS-REFERENCES TO RELATED APPLICATIONS

The present application claims benefit to U.S. Provisional Application No.: 62/320,989 filed on 11 Apr. 2016, titled "DYNAMICALLY FORMATTING SCALABLE VECTOR GRAPHICS," which is incorporated herein by reference.

BACKGROUND

Scalable Vector Graphics (SVG) is a computer graphics image format built as Extensible Markup Language (XML) objects according to the W3C SVG standard developed by the World Wide Web Consortium (W3C). As vector graphics, SVGs are composed of a fixed set of shapes that can be adjusted as the size of the SVG is adjusted, whereas raster graphics are composed of a fixed set of pixels, which can lead to artifacting or pixilation if the size of a raster graphic is adjusted. In some aspects, SVGs may include raster graphics, text, as well as properties defining specific colors, patterns, and metadata for the vector definitions (also referred to as primitives).

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein for enabling a productivity application that operates on an SVG object to dynamically format that SVG object in accord with update notifications within the productivity application. Productivity applications (such as word processors, presentation applications, note taking applications, spreadsheet applications, etc.) may embed or link SVG objects into their document types and thereby apply "look and feel" settings for the document to the SVG object so that as the look and feel settings for the document are updated, the SVG object will incorporate those settings automatically.

Look and feel settings are variously referred to as a "theme," "style," or "design" settings (among other names), and may be referred to collectively within the present disclosure by any of these names. Look and feel settings include settings that affect the visual settings associated with objects across the document (e.g., colors, gradients, effects, shadows, line thickness, transparency, fonts, transitions, formatting, element arrangements). For example, when a "financial" theme is applied to a spreadsheet document, all of the text for positive numbers may be shown in black and negative numbers may be shown in red without the need for a user to manually update each text object's color properties. Allowing for the en masse changing of look and feel settings provides users with an improved user experience (UX) that requires fewer interactions to accomplish a style change across a document or a portion thereof. Additionally, because the computer is required to process fewer user requests when dealing with en masse changes, the fact that SVG objects require fewer memory resources to store than raster images, and the fact that SVG objects can be scaled for display on multiple devices of different display sizes without artifacting or pixilation when resizing, the efficiency of the computer itself is improved when dynamic formatting for SVGs based on update notifications in a parent application is enabled.

SVG objects, as defined by the W3C SVG standard, do not natively support dynamically updating look and feel settings in response to a change in look and feel settings in a parent application. The present disclosure, however, teaches how an SVG object may be made theme-aware and still comply with the W3C SVG standard so that it is portable between files and applications that apply the present disclosure and those that do not. By enabling the dynamic updating of SVG objects, as discussed herein, the benefits to UX and computer efficiency can be realized by documents that include SVG objects without deviating from the W3C SVG standard.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1A:
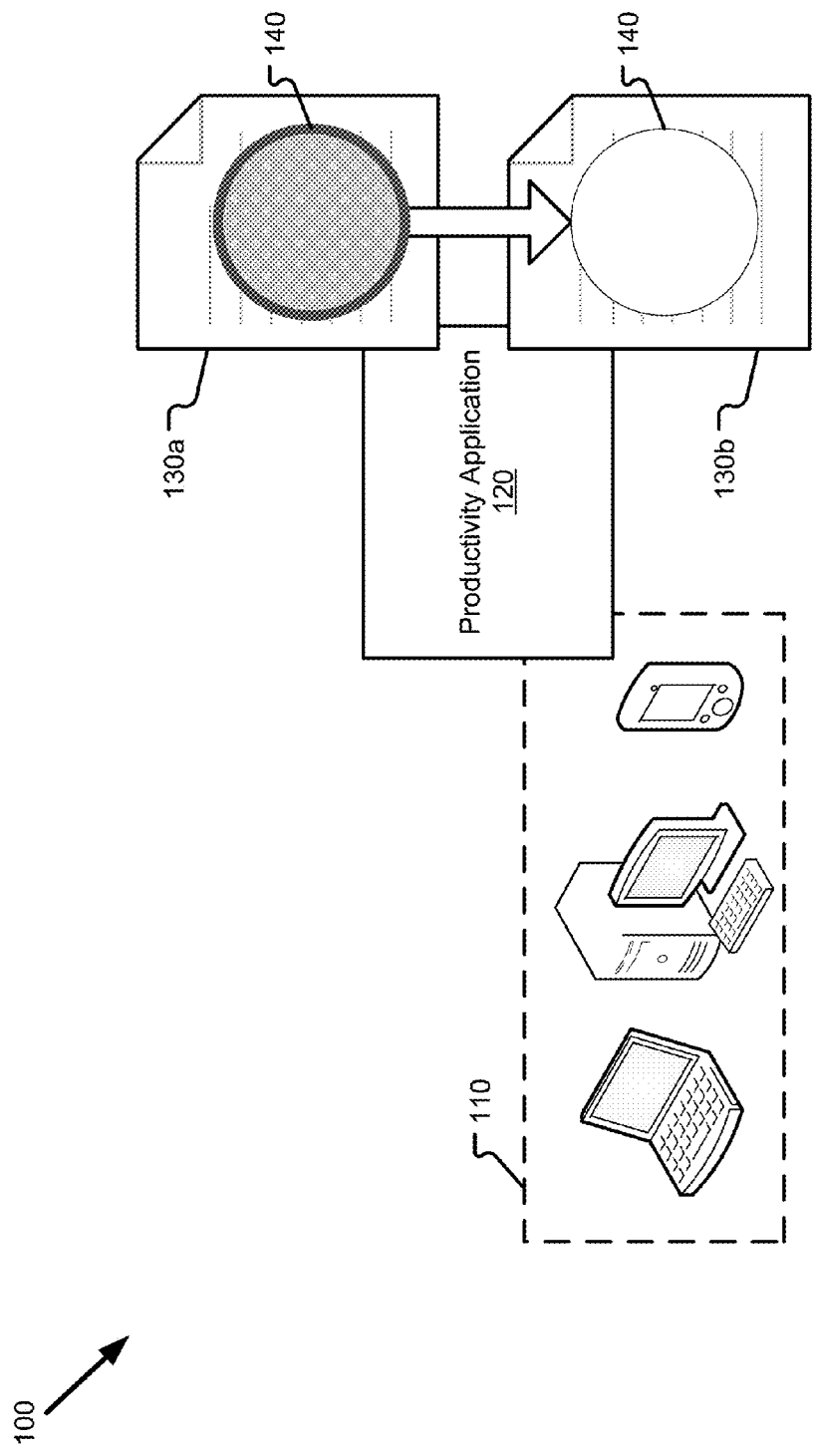
FIG. 1A illustrates an example environment in which SVGs may be dynamically updated based on update notifications within a parent application.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Scalable Vector Graphics (SVG) objects, as defined by the W3C SVG standard, do not natively support dynamically updating look and feel settings in response to a change in look and feel settings in a parent application. The present disclosure, however, teaches how an SVG object may be made theme-aware and still comply with the W3C SVG standard so that it is portable between files and applications that apply the present disclosure and those that do not. By enabling the dynamic updating of SVG objects, as discussed herein, the benefits to user experience (UX) and computer efficiency associated with the document-wide application of look and feel settings can be realized by documents that include SVG images without deviating from the W3C SVG standard.

FIG. 1A illustrates an example environment 100 in which SVGs may be dynamically updated based on update notifications within a parent application. As illustrated, a user machine 110 runs a productivity application 120 that provides a first document 130a having a first theme and a second document 130b having a second theme (generally, documents 130) in which an SVG object 140 may be adapted to become theme-aware.

The user machine 110 is illustrative of a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers. In some aspects, the user machine 110 is a single hardware device, while in other aspects, the user machine 110 may make use of distributed computing resources from several hardware devices to perform its functions. The hardware of these computing systems is discussed in greater detail in regard to FIGS. 4, 5A, 5B, and 6.

In various aspects, the user machine 110 is accessed locally and/or by a network, which may include the Internet, a Local Area Network (LAN), a private distributed network for an entity (e.g., a company, a university, a government agency), a wireless ad hoc network, a Virtual Private Network (VPN) or other direct data link (e.g., Bluetooth connection, a direct wired link). As will be understood, the productivity application 120 may be accessed via the network as a remote application via a thin client operating on the user machine 110 or as a local application running on the user machine 110.

The productivity application 120 includes applications used for authoring documents locally on a user machine 110, collaboratively across multiple user machines 110, or online via a server as a remote application. Examples of productivity applications 120 that may be used locally or collaboratively include, but are not limited to: the Pages® word processing program, the KeyNote® presentation program, the Numbers® spreadsheet program (all available from Apple, Inc. of Cupertino, Calif.), the Illustrator® graphic design software (available from Adobe Systems, Inc. of Seattle, Wash.), the OpenOffice™ suite of productivity tools (available from the Apache Software Foundation of Forest Hill, Md.), or the Office suite of productivity tools (available from Microsoft, Corp. of Redmond, Wash.). Examples of productivity applications 120 that may be used remotely (including collaborative remote use) include, but are not limited to: the Office 365® suite of productivity tools (available from Microsoft, Corp.), the Google Docs™ online word processing application, the Google Sheets™ online spreadsheet application, the Google Slides™ online presentation application (all available from Alphabet, Inc., of Mountain View, Calif.) and the Prezi online presentation application (available from Prezi, Inc. of San Francisco, Calif.). Such applications may store documents 130 locally or in the cloud via cloud storage solutions, such as, for example, Google Drive™ or OneDrive® (available from Alphabet, Inc. and Microsoft, Corp., respectively).

Via the productivity application 120 the user may embed or link to an SVG object 140 (generally referred to as inserting the SVG object 140) so that it appears in a document 130 being authored within that productivity application 120. For example, a user may insert an SVG object 140 (illustrated as a circle in FIG. 1A) as part of the document 130 itself (embedding the XML defining the SVG object 140 into the XML of the document 130) or as an instance of the SVG object 140, linked to a master SVG object. Once the SVG object 140 has been inserted into the document 130 and made theme-aware, it will accept the properties for the look and feel settings for that document 130, and it will accept changes in the look and feel settings as they are made to the document 130. As illustrated, the look and feel settings for the first document 130a affect the display properties of the SVG object 140, and the same SVG object 140 when inserted into the second document 130b adopts its look and feel settings from the second document 130b to appear differently than it does in the first document 130a by adopting the "theme" of the second document 130b.

As illustrated in FIG. 1A, the look and feel settings between the two documents 130 influence the line size, line color, fill color, and fill gradient properties of the SVG object 140, but one of ordinary skill in the art will appreciate that other visual settings for the SVG object 140 may be affected so that a theme affects more or fewer settings than shown in FIG. 1A. Additionally, although a first document 130a and a second document 130b are illustrated in FIG. 1A, in various aspects the first document 130a and the second document 130b may be separate documents 130 or may to two different states of the same document 130. As will be also be appreciated, although illustrated as being provided by a single productivity application 120, in some aspects, the first document 130a and the second document 130b may be provided by different productivity applications 120 (e.g., a first word processing application and a second word processing application, a word processing application and a presentation application).

Figure 1B:
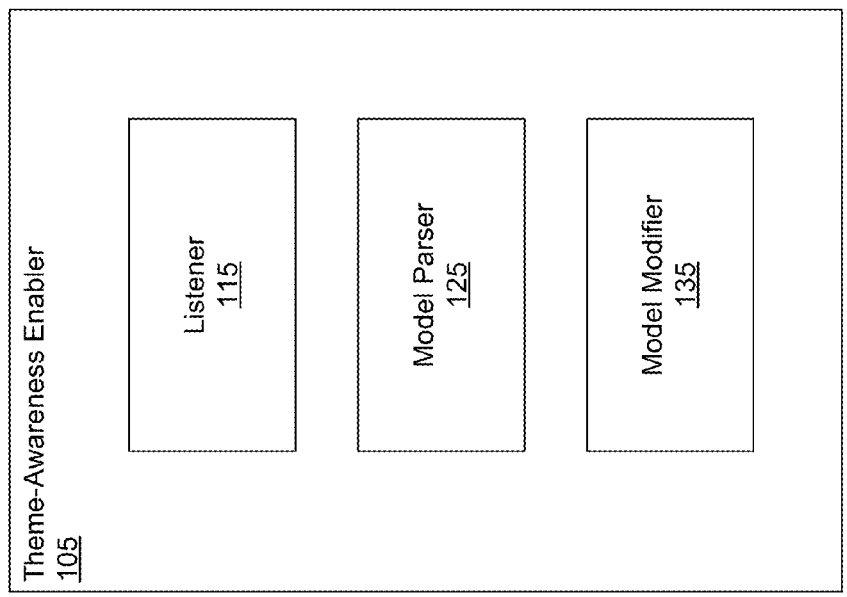
FIG. 1B illustrates example components of a theme-awareness enabler, to enable SVG objects to be made theme-aware within a parent application.

FIG. 1B illustrates example components of a theme-awareness enabler 105, to enable SVG objects 140 to be made theme-aware within the productivity application 120. In various aspects, the theme-awareness enabler 105 may be a system or module that is: an integrated feature or component of the productivity application 120, an optional plugin or modification to the productivity application 120, or a standalone application in communication with the productivity application 120. The theme-awareness enabler 105 includes: a listener 115, operable to detect changes and updates of theme properties within a document 130 of the productivity application 120 or an associated style sheet; a model parser 125, operable to parse the Document Object Models (DOM) of the document 130 and of the SVG object 140 to identify properties of the DOMs that may be affected by a theme update; and a model modifier 135, operable to change the DOM of an SVG object 140 in response to the listener 115 detecting an update of a theme property that is shared with an SVG DOM property identified by the model parser 125.

To enable the SVG object 140 to become theme-aware, the theme-awareness enabler 105 uses the W3C SVG standard's support for cascading style sheets (CSS) in conjunction with theme update notifications from the productivity application 120 to trigger and write back changes to the SVG object 140 to reflect the theme of a given document 130. When an update notification is received, in response to a user transmitting a command to change themes for a document 130, to modify the look and feel settings for the current theme, or to insert a new SVG object 140 into the document 130, the listener 115 identifies the theme property and the SVG object 140 to the model parser 125. The identified SVG object 140 is scanned by the model parser 125 to determine whether it contains any properties that coincide with a display setting defined in the productivity application's 120 look and feel settings.

For example, an SVG object 140 specifying a slash-like image (i.e., "/") may be defined in code as:

```
CODE 1:    <line x1="0" y1="100" x2="100" y2="0"
           stroke-width="2" stroke="black" />
```

As will be noted, the color specified for the image defined in CODE 1 is associated with the definition for "black," but the same color could be specified as a hexadecimal red/green/blue (RGB) value as #000000, or other color definition schemas may be used instead. Alternatively, the image may have its stroke width and stroke color specified in a style element and omit the drawing properties in the image definition as:

```
CODE 2:    <style type="text/css">
           line{stroke-width:2;stroke:black;}
           < /style>
           <line x1="0" y1="100" x2="100" y2="0" />
```

In various aspects, theme-awareness enabler 105 is operable to convert SVG objects 140 defined as in CODE 1 to the definitional style seen in CODE 2 for use in the document 130 or vice versa depending on a preferred mode of operation.

A CSS definition may be defined within the DOM of a document 130 or an SVG object 140, as shown in CODE 2 or in an external CSS file referenced by a style tag (e.g., via a file path). When a look and feel property from the document 130 is applied to the SVG object 140, CSS style elements are written to a class reference within the CSS definition the model modifier 135. The CSS style elements are the display properties for which the SVG object 140 is to be theme-aware, and are set to the values of the look and feel properties from the document 130. In one aspect, the model modifier 135 replaces the theme-aware display properties in the SVG DOM with the class reference, so that as the document 130 has its look and feel properties changed, the CSS file will be updated and the SVG object 140 will exhibit theme-awareness. In another aspect, the model modifier 135 adds the class reference after the affected display properties to preserve the original display properties in the SVG DOM for use in programs that do not support theme-awareness. For example, if the look and feel properties for stroke-width and color are set in the DOM or CSS of the document 130, they may appear in code along with the SVG DOM as:

```
CODE 3:    <style type="text/css">
           .AppThemeStroke{stroke-width:2;stroke:black;}
           </style>
           <line class="AppThemeStroke" x1="0" y1="100" x2="100"
           y2="0" />
```

By applying and referencing the look and feel properties as a class reference to the supported CSS functionality of an SVG object 140, the properties will be applied to each element in the SVG object 140, and the SVG object 140 will be made theme-aware in programs that support theme-awareness and will remain compatible with programs that do not support theme-awareness. Multiple SVG objects 140 may reference a single CSS file via class references so that a single CSS file may be updated in response to look and feel setting changes in the document 130 to affect multiple objects in that document without the need to write to the DOMs of those objects.

In a productivity application 120 that supports theme-awareness, a listener 115 checks for notifications of events that change the look and feel properties of the document 130 that will affect the theme-aware SVG object 140, such as, for example, a user changing a "theme" of the document 130, adjusting the look and feel properties comprising a "theme," or inserting the theme-aware SVG object 140 into a new document 130, which may have different look and feel properties. The listener 115 may listen for changes that affect the entire document 130, and all SVG objects 140 therein, or may listen for a selection even from the productivity application 120 that selects a given SVG object 140. The SVG object 140 has its DOM parsed by the model parser 125 to check whether it contains properties linked with any affected look and feel properties and, if it does, those properties have their values updated in the style settings region of the DOM by the model modifier 135. For example, if a user changes the look and feel properties of a document 130 so that the properties for stroke-width change from a value of "2" to "5" and a stroke-linecap property from "butt" to "round," the code shown in CODE 3 may be adjust to that shown in CODE 4:

```
CODE 4:    <style type="text/css">
           .AppThemeStroke{stroke-width:5;stroke:black;}
           </style>
           <line class="AppThemeStroke" x1="0" y1="100" x2="100"
           y2="0" />
```

Because the SVG object 140 defined in CODE 3 specifies a class reference (AppThemeStroke) that indicates a stroke-width property as being linked to the document theme, a change in the look and feel of stroke widths for the document 130 will affect the definition in the style region CSS of the theme-aware SVG object's 140 DOM and the display of the SVG object 140 in the document 130. Similarly, because the SVG object 140 defined in CODE 3 did not specify a stroke-linecap property via its CSS definition as linked to the document theme, a change in the look and feel of linecaps for the document 130 will not affect the definitions in the style region of the theme-aware SVG's 140 DOM or the display of the SVG object 140 in the document 130. As will be understood, although the property for stroke color is linked between the SVG object 140 and the document 130, because the listener 115 did not detect a change to the stroke color properties from the look and feel properties for the document 130, the callout in the style region of the DOM for a "black" stroke will remain unaffected, and the SVG object 140 will remain displayed as black in the document 130.

Figure 2A:
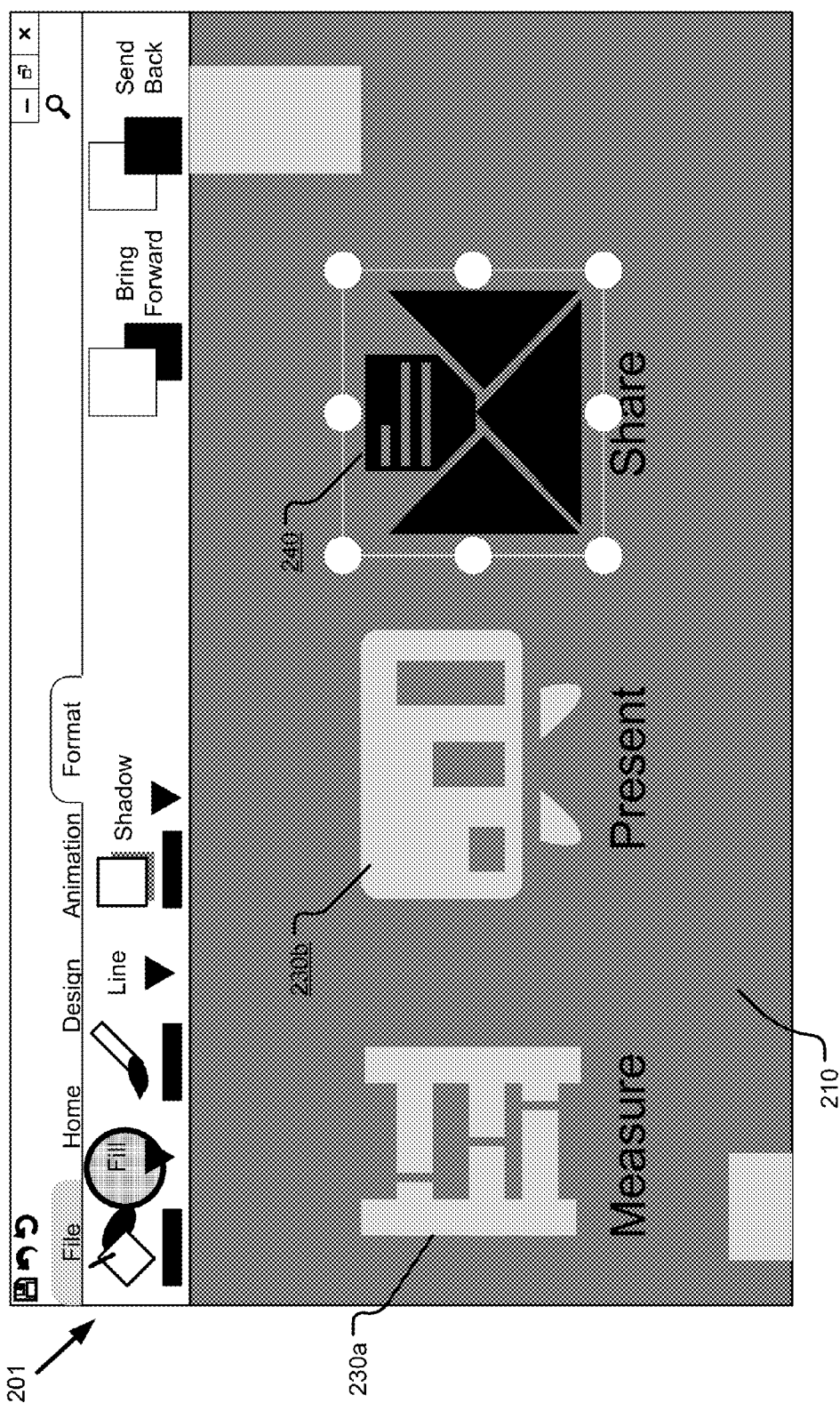
FIGS. 2A-E illustrate a series of actions taken in sequence that affect a canvas of a document that includes an SVG object and is governed by a theme.
Figure 2B:
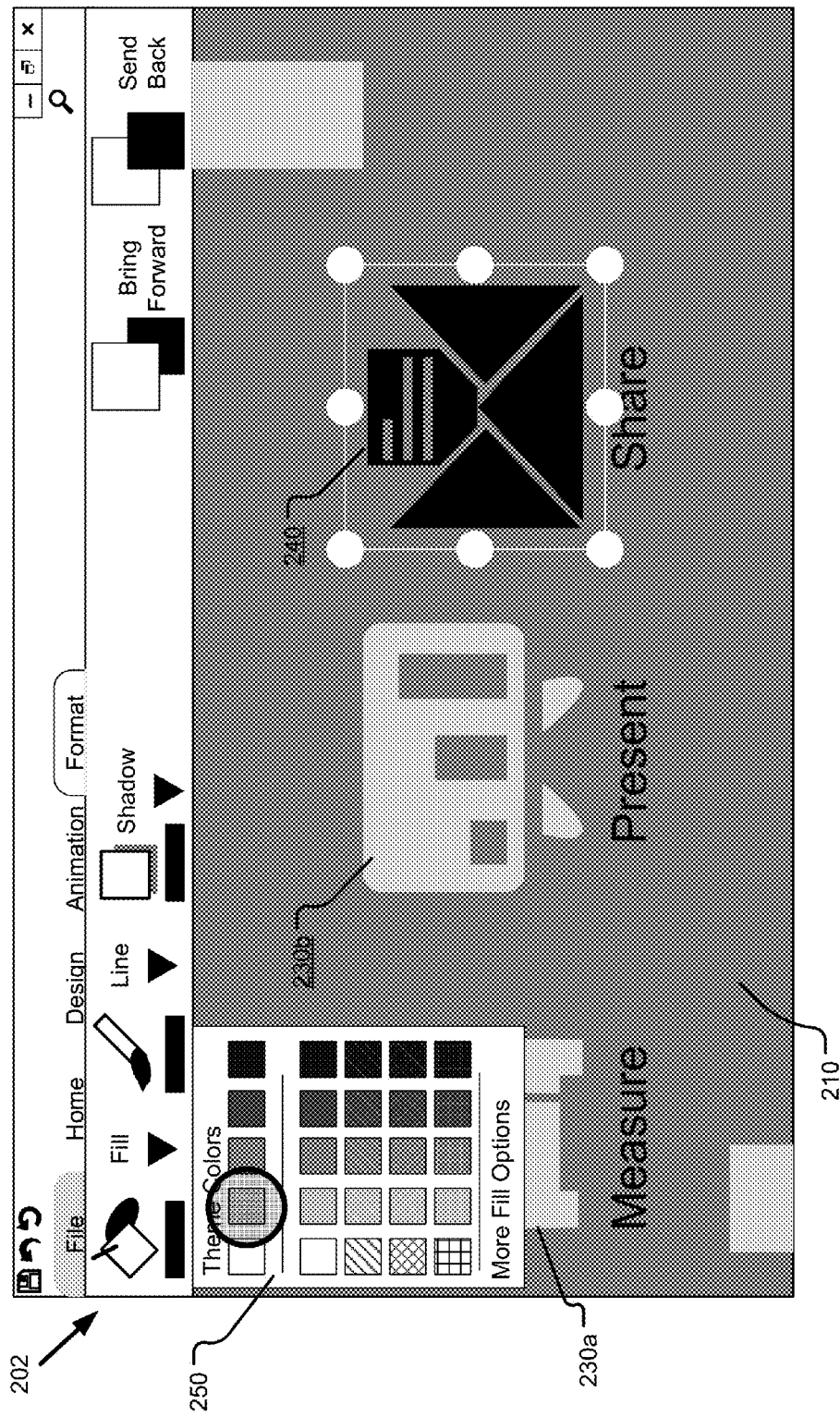
Figure 2C:
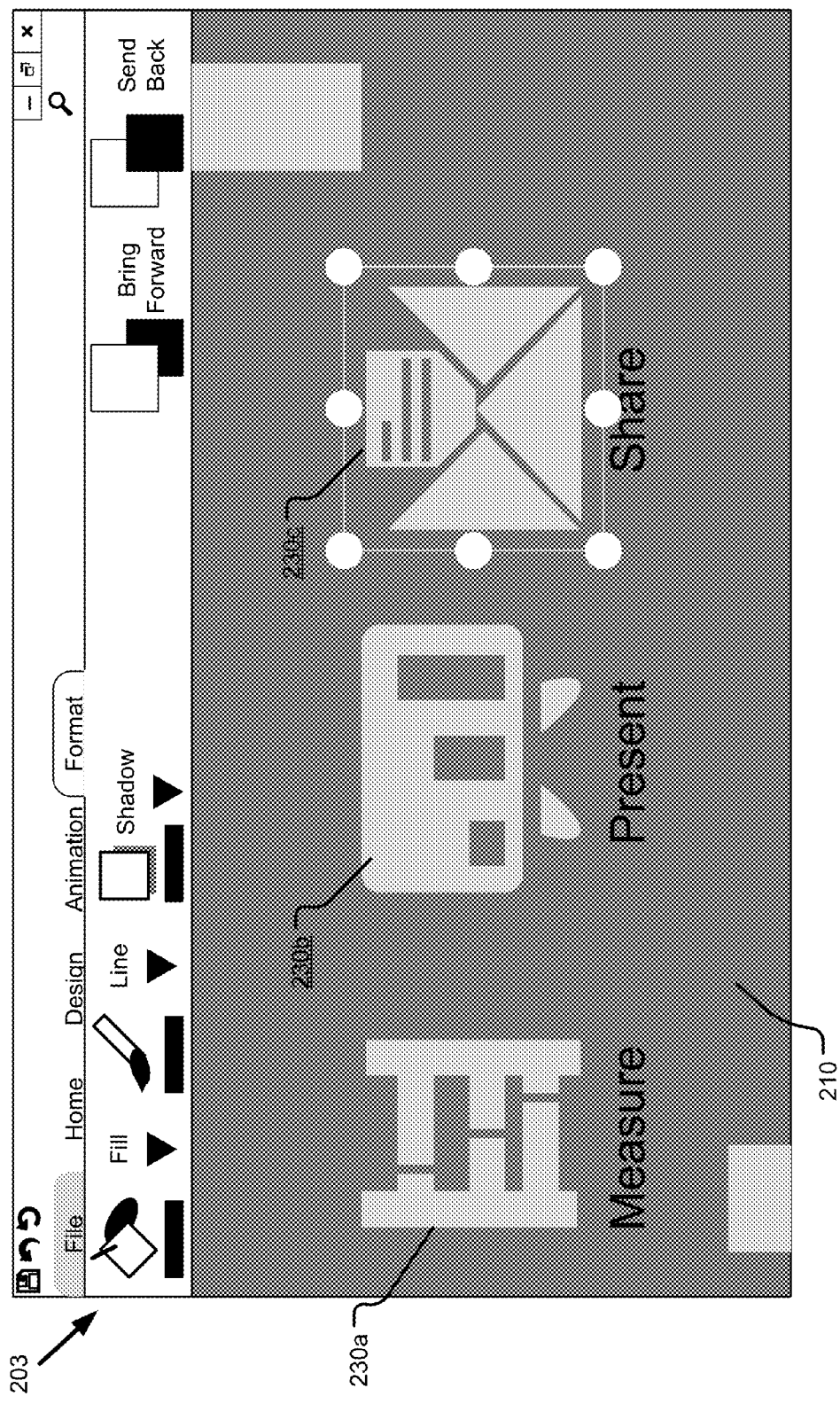
Figure 2D:
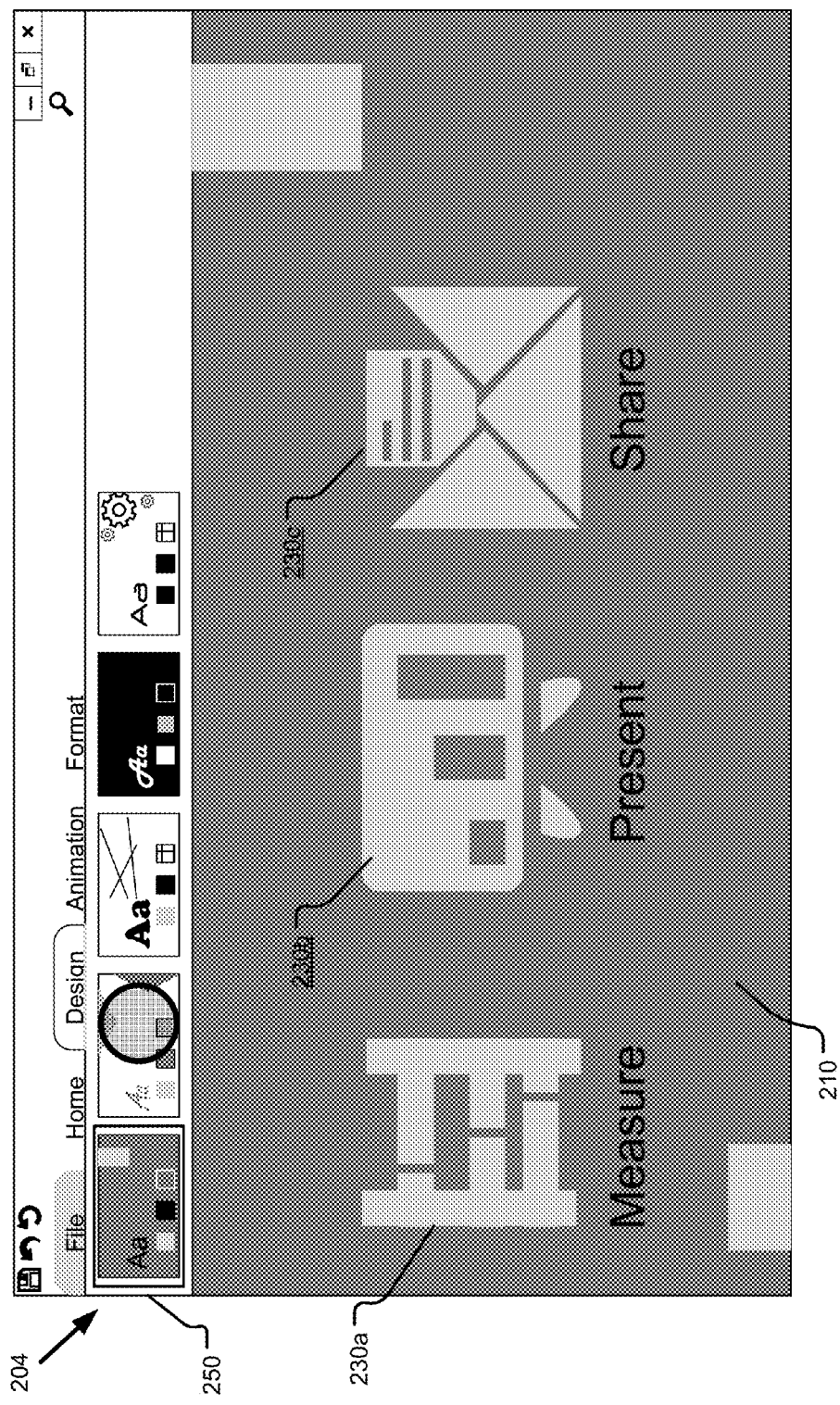
Figure 2E:
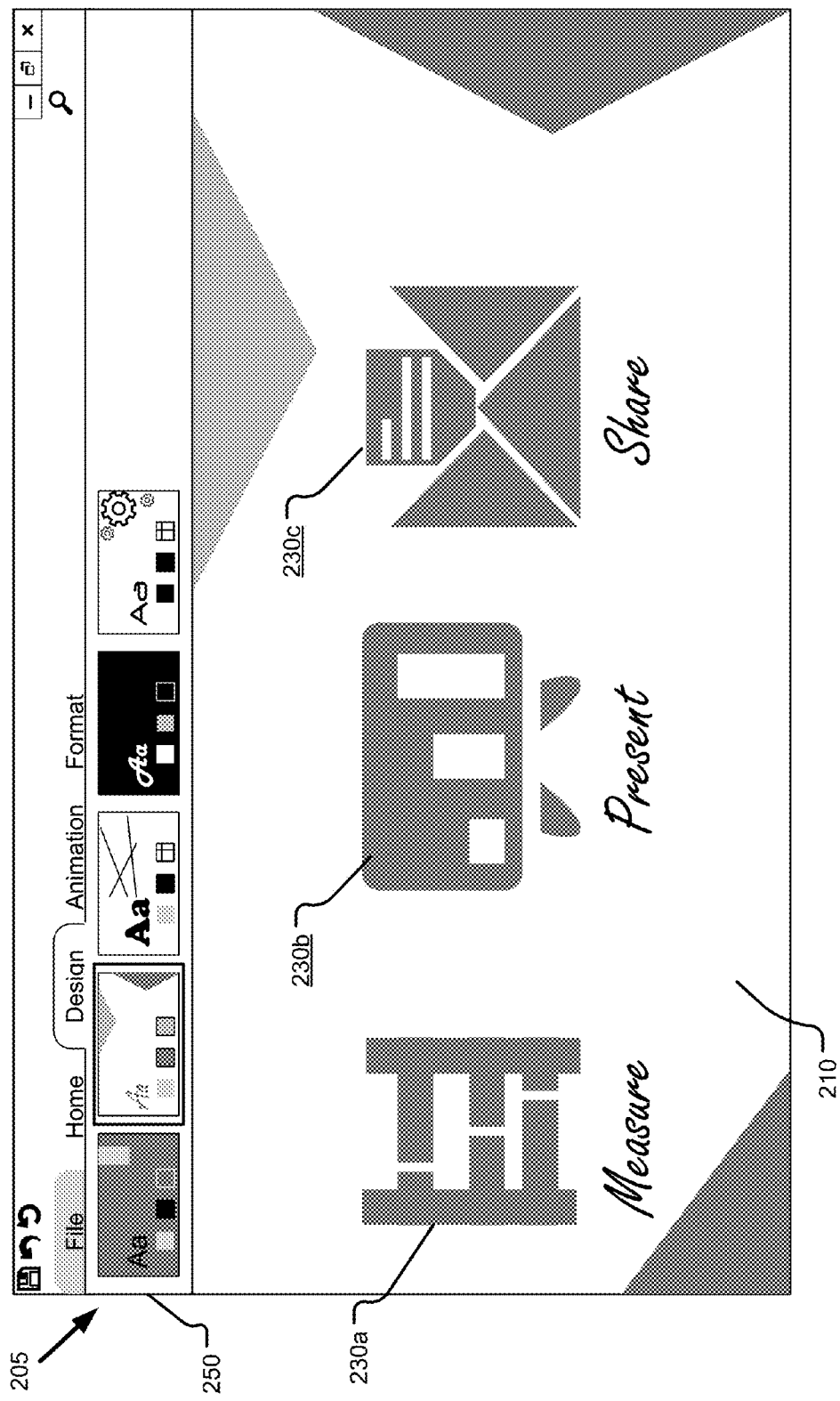

FIGS. 2A-E illustrate a series of actions 201-205 taken in sequence that affect a canvas 210 of a document 130 that includes an SVG object 140 and is governed by a theme 220 (not illustrated). As will be understood, a theme 220 is a collection of look and feel properties that a user may switch between to affect multiple objects, backgrounds, and layouts of a document 130, and may be variously referred to as a "theme," "style," or "design" (among other names). A first theme 220a (specifying a dark background, a set of rectangular accent objects, and a first set of theme colors) is active in FIGS. 2A-D and a second theme 220b (specifying a light background, a series of overlaid triangular accent objects, and a second set of theme colors) is active in FIG. 2E. FIGS. 2D and 2E illustrate various theme previews as graphical user interface (GUI) elements 250 that a user may select from to change the look and feel of the document 130.

As illustrated in FIG. 2A, the canvas 210 initially includes three objects: a first theme-aware object 230a, a second theme-aware object 230b (generally, theme-aware objects 230), and a theme-unaware object 240. Throughout the actions 201-205, the theme-unaware object 240 will be converted into a third theme-aware object 230c. As discussed herein, the theme-unaware object 240 is an SVG object 140 whose display properties in the canvas 210 do not change when the theme 220 is changed, whereas theme-aware objects 230 will have their display properties changed when the theme 220 changes. In various aspects, the first and second theme-aware objects 230a, 230b may be SVG objects 140 that have previously been made theme-aware, or they may be another type of object (e.g., a raster graphic or a vector graphic defined by a different standard).

FIG. 2A illustrates a first action 201, where a user is selecting the theme-unaware object 240 in the canvas 210 for manipulation. Moving from FIG. 2A to FIG. 2B, second action 202 illustrates the user accessing a GUI element 250 in the document 130 to apply a theme property for a fill color to the theme-unaware object 240. As will be appreciated, a GUI element 250 is just one example of how a theme property may be applied to a theme-unaware object 240; dialog boxes with graphical or textual controls to assign theme properties to a theme-unaware objects 240 or portions thereof are also possible. As will also be appreciated, fill color is just one example of a display property for an object that may be applied and linked to a theme. Other examples of display properties that may be linked from a theme to an object include, but are not limited to: outline color, outline weight (i.e., line thickness), outline style (e.g., solid, dashed, striped), fill gradient, fill pattern, primary/secondary/tertiary/etc. fill color, shadow properties (e.g., offset, color, pattern, opacity), opacity, filters, and font properties (e.g., typeface, size, color, styles/effects and properties thereof).

In response to selecting a theme fill color from the GUI element 250, such as is illustrated in FIG. 2B, the productivity application 120 providing the document 130 performs third action 203 to write the theme elements that were selected by the user to the SVG object 140 as CSS styles, transforming the theme-unaware object 240 into a theme-aware object 230. Alternatively, if the user selected a non-theme property, the productivity application 120 will instead change that property in the SVG object 140, leaving it a theme-unaware object 240. As will be appreciated, a theme-aware object 230 may be made variously more or less theme-aware as more or fewer look and feel properties are linked with a theme-aware object 230, respectively. FIG. 2C illustrates the outcome of third action 203, in which the SVG object 140 has been converted from the theme-unaware object 240 into the third theme-aware object 230c and now displays the theme color as its fill color.

FIG. 2D illustrates fourth action 204, in which a user selects a different theme 220 from the currently applied first theme 220a to be applied to the document 130 from a GUI element 250 showing various previews of themes 220.

FIG. 2E illustrates the fifth action 205, in which the second theme 220b is applied to the document 130, modifying the canvas 210 and the theme-aware objects 230 in the canvas 210. As illustrated, each of the theme-aware objects 230 have their fill color linked to a theme color so that as the theme 220 changes from the first theme 220a to the second theme 220b (each with different look and feel properties defined for a thematic fill color for objects), the fill color of the theme-aware objects 230 will retain the link to the thematic fill color, but will be displayed in the canvas 210 as the current theme's 220 fill color. For example, if the first theme 220a defines a thematic fill color of red, the second theme defines a thematic fill color of blue, and the theme-aware objects 230 have the thematic fill color written as a CSS style to the SVG object 140, then as the user switches between the two themes 220, the theme-aware objects 230 will change between red and blue.

When a theme-aware object 230 that is an SVG object 140 is moved from the document 130 to a document 130 that does not support theme-awareness for SVG objects 140 or the document 130 is opened by a productivity application 120 that does not support theme-awareness for SVG objects 140, the last known properties for the SVG object 140 are retained by the SVG object 140 in its new location. For example, when a theme-aware SVG object displays a thematic fill color of red in a document 130 that supports theme-awareness and is moved to a document 130 that does not, it will be displayed as red because the property defining the fill color as red has been written to the SVG object 140 and any theme-awareness that is not supported in the new document 130 can be ignored by the associated productivity application 120 without breaking support for the W3C SVG standard.

Figure 3:
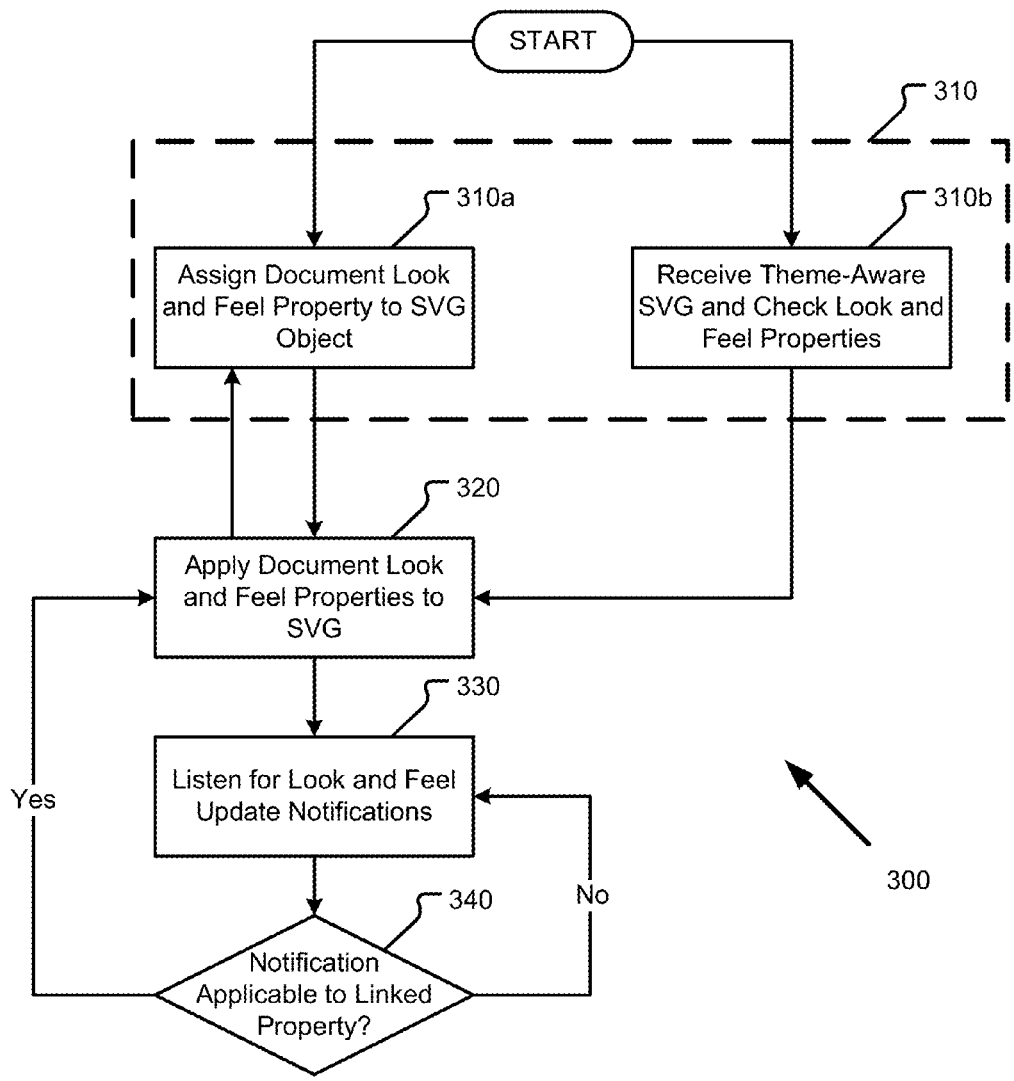
FIG. 3 is a flowchart showing general stages involved in an example method for enabling theme-awareness in SVGs such that the SVGs may be dynamically updated based on update notifications within a parent application.

FIG. 3 is a flowchart showing general stages involved in an example method 300 for enabling theme-awareness in SVGs such that the SVGs may be dynamically updated based on update notifications within a parent application. Method 300 begins at OPERATION 310, where a theme-aware SVG object 140 is added to a document 130. In various aspects, adding a theme-aware SVG object 140 to a document 130 may be done by making a theme-unaware SVG object 140 theme-aware, as in SUB-OPERATION 310a, or by receiving an already theme-aware SVG object 140 from another document 130 or referencing a file for the theme-aware SVG object 140, as in SUB-OPERATION 310b.

At SUB-OPERATION 310a a document look and feel property is assigned to an SVG object 140 by a user or a system to make it theme-aware (or more theme aware). A property from the document's look and feel properties may be manually selected by a user to link to a property of an SVG object 140, or a system may automatically match properties of an SVG object 140 to look and feel properties for a document 130 based on a probabilistic analysis of the document 130 and the SVG object 140 to match properties that are likely to be linked. For example, the system may automatically determine which primitives of an SVG object 140 define the largest area having a given fill color, and automatically link a "fillcolor1" look and feel property from the document 130 to those primitives and automatically link a "fillcolor2" or "accentcolor" look and feel property from the document 130 to the primitives that define the second largest area having a given color. Alternatively, a user may manually link desired properties of an SVG object 140 to desired look and feel properties of a document 130 via a GUI (and example of which is illustrated in FIGS. 2A-E) or a textual dialog.

As described herein, properties may be linked, making an SVG object 140 theme-aware, by defining a class tag in the CSS region of an SVG DOM and including the class tag in the definition of affected primitives comprising the SVG object 140. For example line, polyline, rectangle, circle, ellipse, polygon, and path primitives comprising the SVG object 140 and having a stroke-width property (i.e., a border or line thickness) may be linked to a look and feel property in a document 130 for stroke-width by defining a class tag in the SVG DOM that is interpretable by the listener of a productivity application 120 as related to a look and feel property for the stroke width in the document 130. The class tag is then added to the definitions of the primitives that will be made theme aware. In some aspects, the original properties defined within the primitives are replaced by the class tag, while in other aspects those properties and associated values are retained in the definitions, albeit earlier in the parsing order of the definition, so as not to override the values set and linked from the look and feel settings of the document 130 via the class tag.

At SUB-OPERATION 310b an SVG object 140 that is already theme-aware is added to the document 130 and its properties are checked for links to document look and feel properties. In various aspects, the theme-aware SVG object 140 may be received from a different document 130, having different values for look and feel properties than the current document 130, or it may be retrieved from a standalone file (e.g., a stencil definition).

Proceeding from OPERATION 310 to OPERATION 320, method 300 applies the look and feel properties of the document 130 to the linked properties of the SVG object 140. At OPERATION 320, the values in the class tag are updated to match those in the document for the linked look and feel properties. As will be appreciated, method 300 may return to SUB-OPERATION 310a from OPERATION 320 to enable a user to link additional properties between the SVG object 140 and the document 130 from those initially received from OPERATION 310 as well as reassigning links or decoupling links between properties via a GUI or textual dialog.

Proceeding from OPERATION 320 to OPERATION 330, notifications of look and feel property changes are listened for in the productivity application 120. When a change notification is detected, it is determined at DECISION 340 whether the property changed is referenced in the SVG object 140. If the look and feel property that changed is referenced in the SVG object 140, method 300 returns to OPERATION 320, where the class definition in the DOM of the SVG object 140 is changed to reflect the new value or values for the look and feel properties of the document 130. Otherwise, method 300 returns to OPERATION 330 to continue listening for change notifications.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
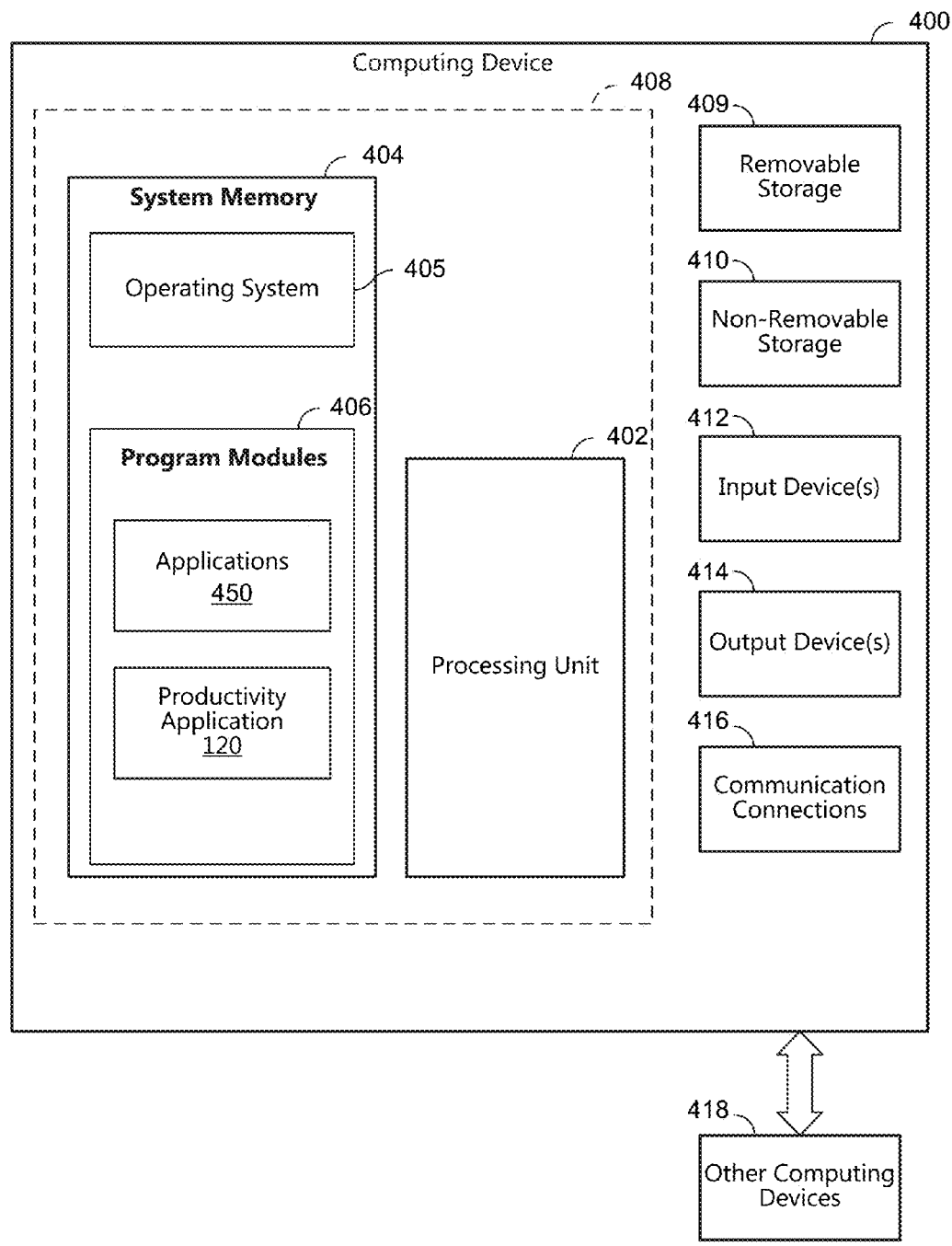
FIG. 4 is a block diagram illustrating physical components of a computing device with which examples may be practiced.
Figure 5A:
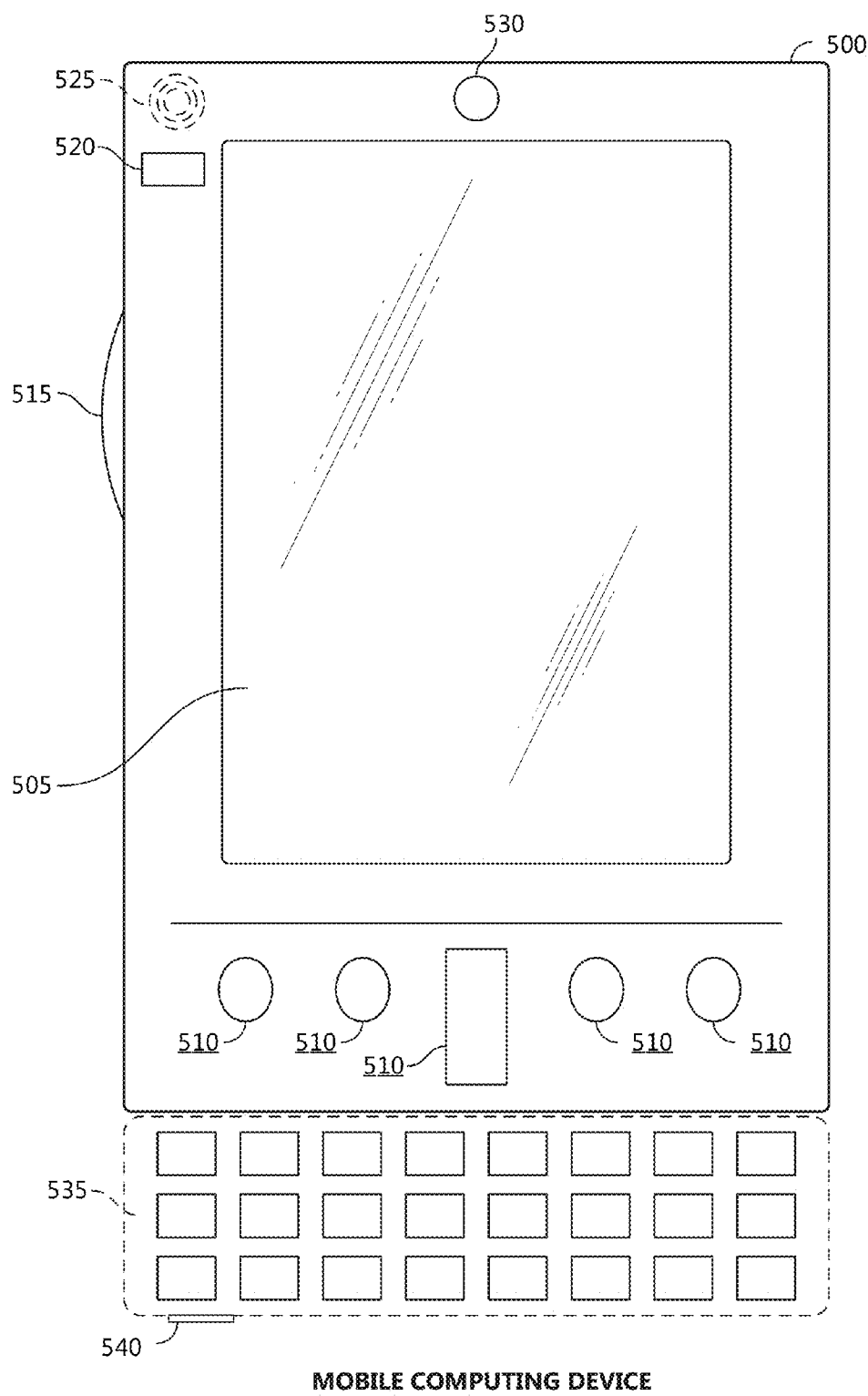
FIGS. 5A and 5B are block diagrams of a mobile computing device with which aspects may be practiced.
Figure 5B:
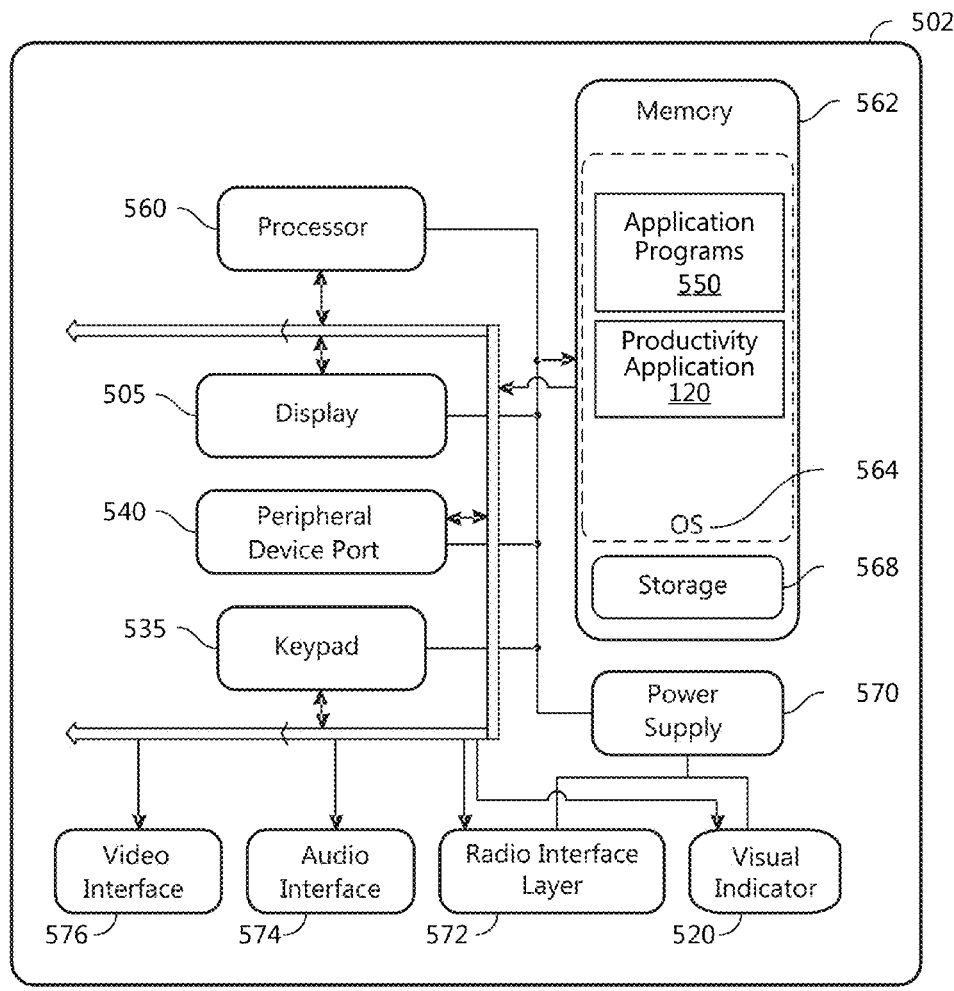
Figure 6:
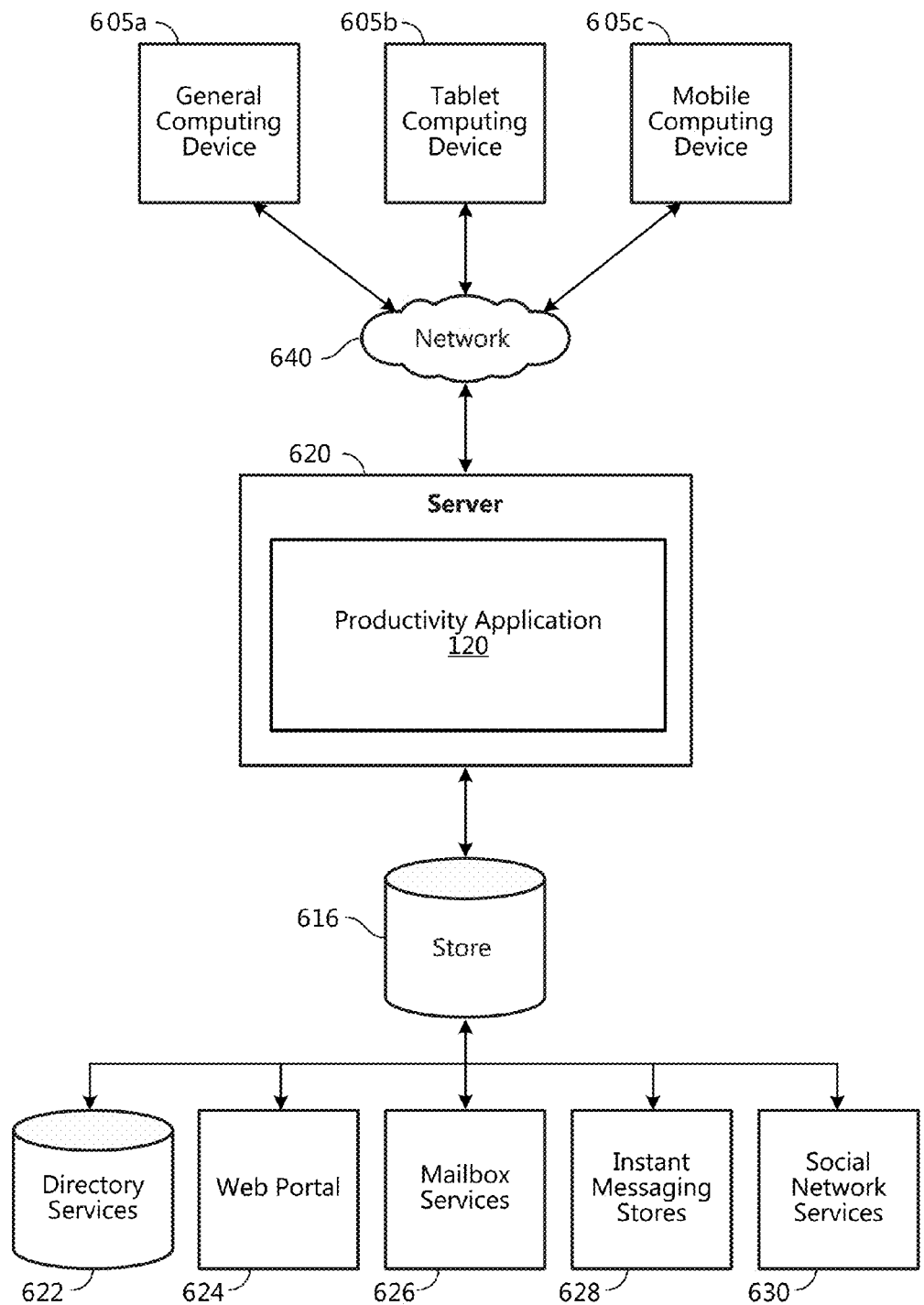
FIG. 6 is a block diagram of a distributed computing system in which aspects may be practiced.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes a productivity application 120, operable to enable a software application 450 to employ the teachings of the present disclosure via stored instructions. The operating system 405, for example, is suitable for controlling the operation of the computing device 400. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., productivity application 120) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates a peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, a productivity application 120 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated, such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for automatic presentation of blocks of repeated content as described above. Content developed, interacted with, or edited in association with the productivity application 120 is enabled to be stored in different communication channels or other storage types. For example, various documents may be stored using a directory service 622, a web portal 624, a mailbox service 626, an instant messaging store 628, or a social networking site 630. The productivity application 120 is operative to use any of these types of systems or the like for distribution of selected content, as described herein. According to an aspect, a server 620 provides the productivity application 120 to clients 605a-c (generally clients 605), which may be run user machines 110. As one example, the server 620 is a web server providing productivity application 120 over the web. The server 620 provides productivity application 120 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

We claim:

1. A method for dynamically formatting scalable vector graphic (SVG) objects based on update notifications of look and feel setting changes in a parent application, comprising:

adding, by a computer, an SVG object to a document, the SVG object including a display property linked to a look-and-feel property of the document, wherein the look-and-feel property is related to a theme of the document, and wherein the display property is linked to the look-and-feel property by defining, in a cascading style sheet (CSS) region of a document object model (DOM) of the SVG object, a class tag that is interpretable by the document as related to the look-and-feel property;

setting, by the computer, a value of the look-and-feel property as a value for the display property of the SVG object by setting a value in the class tag equal to the value of the look-and-feel property;

listening, by the computer, for an update notification that is generated in response to a change made to the look-and-feel property within the document, the update notification including a new value of the look-and-feel property based on the change; and updating, by the computer, the value for the display property of the SVG object to the new value of the look-and-feel property by setting the value in the class tag equal to the new value of the look-and-feel property.

2. The method of claim 1, wherein adding the SVG object to the document further comprises:

receiving, by the computer, a SVG object in the document, wherein the SVG object does not include the display property linked to the look-and-feel property of the document;

receiving, by the computer, a selection of a desired display property of the-SVG object;

receiving, by the computer, a selection of a desired look-and-feel property of the document; and linking, by the computer, the desired display property to the desired look-and-feel property.

3. The method of claim 2, wherein the selection of the desired display property and the selection of the desired look-and-feel property are received from a user.

4. The method of claim 2, wherein the desired display property and the desired look-and-feel property are automatically determined by the computer based on a probabilistic analysis of the document and the SVG object.

5. The method of claim 2, wherein linking the desired display property to the desired look-and-feel property further comprises:

setting, by the computer, the value in the class tag equal to the value of the desired look-and-feel property.

6. The method of claim 5, further comprising:

removing, by the computer, the desired display property from a definition of a primitive of the SVG object in the DOM; and adding, by the computer, the class tag to the definition of the primitive.

7. The method of claim 1, wherein adding the SVG object to the document further comprises:

receiving, by the computer, the SVG object from a different document having a different set of look-and-feel properties.

8. The method of claim 1, wherein the change made to the look-and-feel property within the document includes a user adjustment of the value of the look-and-feel property to the new value.

9. The method of claim 8, wherein the user adjustment of the value of the look-and-feel property to the new value comprises selecting a new theme for the document.

10. The method of claim 1, further comprising:

receiving, by the computer, a selection of a desired display property for the SVG object from a user, wherein the desired display property is linked to the look-and-feel property;

receiving, by the computer, a selection of a value for the display property that is not related to the theme of the document; and unlinking, by the computer, the desired display property from the look-and-feel property by removing the look-and-feel property from the CSS region of the DOM of the SVG object and hardcoding the value for the display property in a primitive definition.

11. The method of claim 1, further comprising:

receiving, by the computer, a selection of a desired display property for the SVG object from a user, wherein the desired display property is linked to a first look-and-feel property;

receiving, by the computer, a selection of a second look-and-feel property from the user; and relinking, by the computer, the desired display property from the first look-and-feel property to the second look-and-feel property by removing a class tag associated with the first look-and-feel property from the CSS region of the DOM of the SVG object and inserting a class tag associated with the second look-and-feel property into the CSS region of the DOM.

12. A system for dynamically formatting scalable vector graphic (SVG) objects based on update notifications of look and feel setting changes in a parent application, comprising:

a processing unit; and a system memory, including instructions, which when executed by the processing unit are operable to provide:

a listener, operable to identify a look and feel setting change made in the parent application, wherein the look and feel setting change includes adjustment of a value of a look-and-feel property of a document hosted by the parent application from a first value to a second value;

a model parser, operable to parse an SVG Document Object Model (DOM) of an SVG object in the parent application to identify a display property of the SVG object that matches the look-and-feel property of the document, wherein the first value of the look-and-feel property of the document is set as a value for the display property of the SVG object within the SVG DOM by defining a cascading style sheet (CSS) definition within the SVG DOM including a class reference, and setting the class reference for the display property to the first value of the look-and-feel property; and a model modifier, operable to modify the SVG DOM in response to the listener identifying the look and feel setting change, wherein the modification includes an update of the value for the display property of the SVG object to the second value of the look-and-feel property, the update comprising setting the class reference for the display property to the second value of the look-and-feel property.

13. The system of claim 12, wherein the listener is further operable to identify the SVG object based on receiving a selection event notification identifying the SVG object from the parent application.

14. The system of claim 12, wherein the listener is further operable to identify the SVG object based on receiving an insertion event notification for inserting the SVG object into the document hosted by the parent application.

15. The system of claim 12, wherein the SVG object is an instance of a master object stored by the parent application.

16. The system of claim 12, wherein modifying the SVG DOM further comprises:

replacing the display property in the SVG DOM with the class reference.

17. The system of claim 12, wherein an operability of the SVG object to be displayed in an application that does not support themes for SVG objects is preserved.

18. A computer readable storage device including instructions to enable a computer to dynamically format scalable vector graphic (SVG) objects based on update notifications of look and feel setting changes in a parent application, the instructions comprising:

receiving a SVG object in a document, the SVG object comprising a document object model (DOM) defining a plurality of display properties related to the SVG object;

receiving a selection of a desired display property from among the plurality of display properties for the SVG object;

receiving a selection of a given look-and-feel property of the document, wherein the given look-and-feel property is related to a theme for the document;

linking the desired display property to the given look-and-feel property by defining, in a cascading style sheet (CSS) region of the DOM of the SVG object, a class tag that is interpretable by the document as related to the given look-and-feel property;

setting a value of the given look-and-feel property as a value for the desired display property of the SVG object by setting a value in the class tag equal to the value of the given look-and-feel property;

listening for an update notification that is generated in response to a change made to the given look-and-feel property within the document, the update notification including a new value of the given look-and-feel property based on the change; and updating the value for the desired display property of the SVG object to the new value of the given look-and-feel property by setting the value in the class tag equal to the new value of the given look-and-feel property.

19. The computer readable storage device of claim 18, wherein the SVG object is operable to be displayed in an application that does not support themes for SVG objects, wherein the plurality of display properties determine how the application displays the SVG object.

* * * * *